P. E. HOLT.
AUTO TRACTOR.
APPLICATION FILED SEPT. 5, 1917.

1,314,651.

Patented Sept. 2, 1919.
3 SHEETS—SHEET 1.

WITNESSES:
Charles Pickles
J. H. Herring

INVENTOR
Pliny E. Holt
BY Strong & Townsend
ATTORNEYS

P. E. HOLT.
AUTO TRACTOR.
APPLICATION FILED SEPT. 5, 1917.

1,314,651.

Patented Sept. 2, 1919.

WITNESSES:

INVENTOR
Pliny E. Holt
BY Strong & Townsend
ATTORNEYS

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

AUTO-TRACTOR.

1,314,651.  Specification of Letters Patent.  Patented Sept. 2, 1919.

Application filed September 5, 1917. Serial No. 189,761.

*To all whom it may concern:*

Be it known that I, PLINY E. HOLT, a citizen of the United States, residing at Stockton, in the county of San Joaquin and State of California, have invented new and useful Improvements in Auto-Tractors, of which the following is a specification.

This invention relates to a traction attachment for auto trucks; the object being to provide a simple, practical self-laying track substitute for the ordinary round wheels of an auto truck or other wheeled vehicle to which the invention may be applicable.

A particular object is to adapt heavy army trucks for practical use over terrene that would otherwise be impassable with heavy loads.

Having reference to the accompanying drawings—

Figure 1:
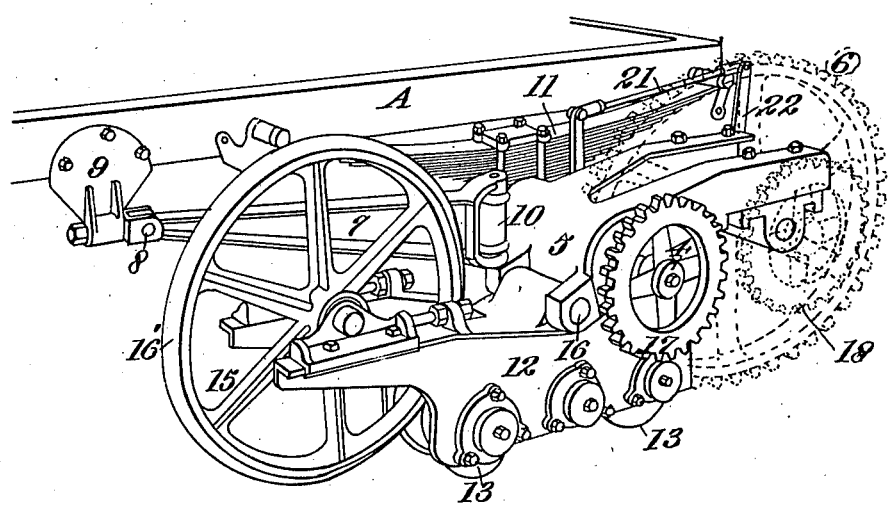
Figure 1 is a perspective view of the track attachment for auto trucks.
Figure 2:
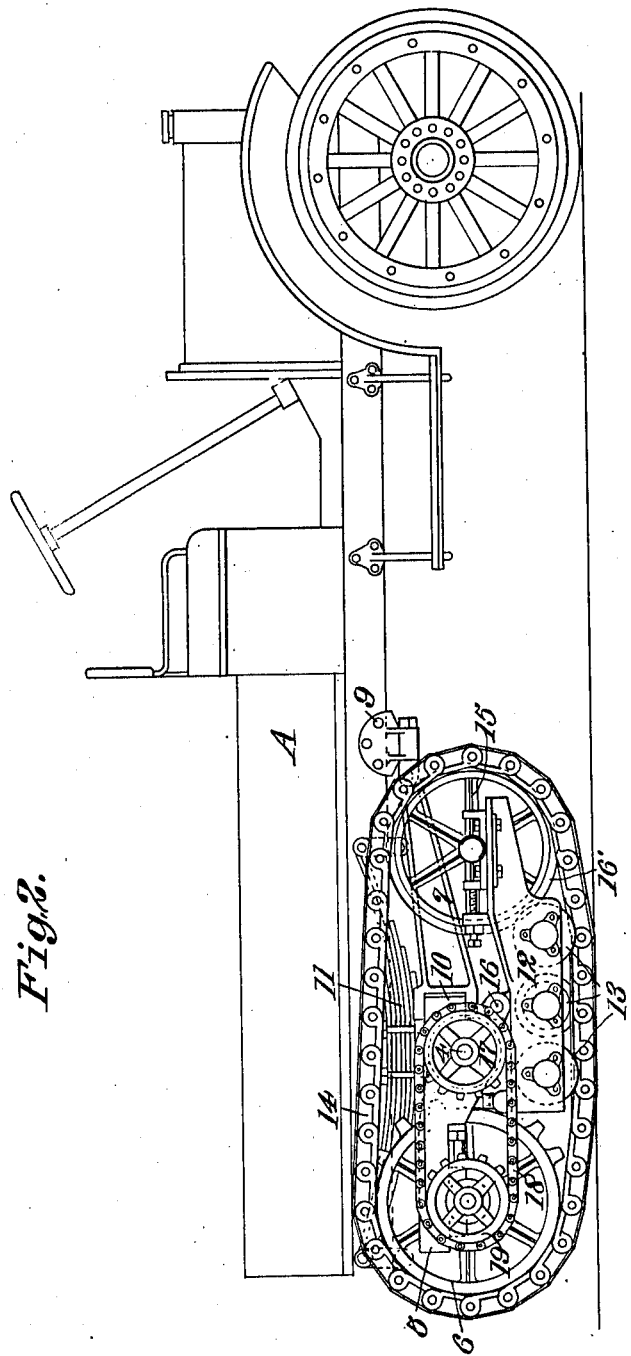
Fig. 2 is a side elevation of the attachment shown applied to an auto truck.
Figure 3:
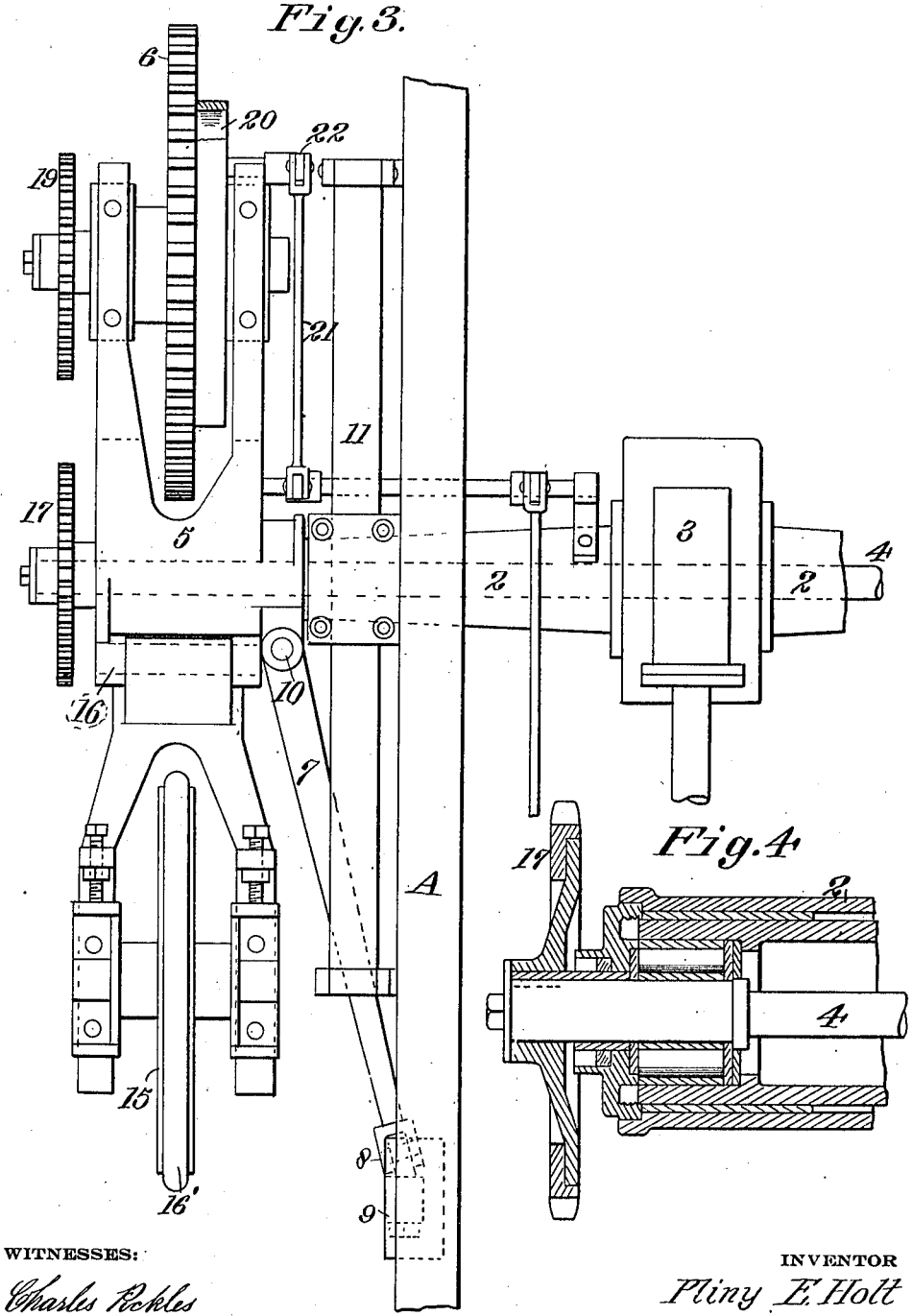
Fig. 3 is a detail plan view of the attachment with track chains removed.
Figure 4:
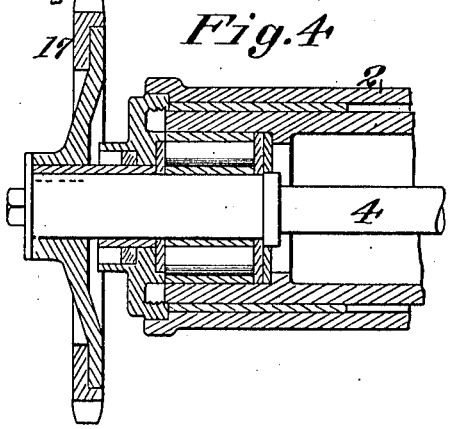
Fig. 4 is a detail section showing the drive connection to the truck axle.

A represents a well-known type of commercial auto truck from which the rear wheels have been removed and the traction attachment of the present invention substituted. 2 is the usual hollow axle with standard differential 3, and 4 the floating axle by which the traction wheels are driven. Suitably mounted on the end of the stationary hollow axle 2 at each side of the vehicle and in the space formerly occupied by the round wheels is a supplemental frame 5. This frame is bifurcated at the rear to support the driving sprocket 6 and is held against rotation on the hollow axle by a forwardly projecting extension, here shown in the shape of a radius rod 7. The latter pivots at 8 in a bracket 9 on the main frame A, and has a jointed connection on a vertical pivot 10 on the supplemental frame 5. The supplemental frame really consists of the two members 5 and 7, and so connected to the main frame A that the supplemental frame will not rock on its support and yet will allow for the proper spring action of the usual elliptical springs 11. Suitably fulcrumed on transverse pivots on or under the supplemental frame 5 is a roller truck 12 having flanged rollers 13 adapted to run on a double track formed on the inside of the endless flexible track belt 14. 15 is an idler adjustably mounted on a forked horn on the truck 12, and arranged in line with the driving sprocket 6 and coöperating with the latter properly to guide the track belt and hold it in supporting position with the rollers.

The periphery of the idler 15 is grooved to carry a rubber tire 16', which fits in between the tracks and the track belt 14 and gives a yielding noiseless support for the track belt. The truck 12 is free to oscillate on its pivot 16 in order to allow the track belt to adapt itself to the inequalities of the ground traversed. Neither the sprocket 6 nor the idler 15 carry any part of the load. They are raised above the plane in which the underside of the truck rollers run, the rollers and truck 12 supporting the entire load.

The front idler 15 and its truck rock in unison about pivot 16; the supplemental frame 5 being at all times stationary with respect to the truck and front idler and substantially stationary with respect to its support on the end of the sleeve or hollow axle 2.

The machine is driven through power transmitted by sprocket 17 on the end of the floating axle 4 and a chain 18 back to another sprocket 19 on the shaft of the track belt sprocket 6.

The control of the vehicle on grades is effected through a brake mechanism which is carried by and is directly mounted on the hub of the track belt sprocket 6; this brake mechanism comprising a band-brake 20 connected by a rod 21 with a brake lever 22, which latter in turn is manipulated by the usual connections from the driver's seat. The brake mechanism acting directly as it does upon the brake belt driving sprocket 6 affords complete control of the machine at all times.

The track belt 14 has relatively short links as compared with the track belts commonly employed in tractors of this type thereby facilitating articulation with consequent smooth running and rendering the machine capable of traveling at comparatively high speeds. The rubber tired sprocket 15 fitting as it does in between the tracks of the track belt and engaging the gudgeons therein, tends very greatly to the elimination of noise and clatter so that in actual practice it is found that a machine of this sort runs very quietly and on good roads at speeds from 15 to 20 miles an hour.

The rigid support of the supplemental frame to prevent oscillation or catapulting of the truck and truck mechanism affords stability and strength while the pivoting of the truck on the supplemental frame and the mounting of the front idler on the pivoted truck and arranging the truck with rollers below the lowest point of the driving sprocket 6 and front idler produces the necessary resiliency in the track belt, gives an extended bearing surface and without any danger of breakage.

It is necessary that the sprocket and guide wheels be movable toward and from each other whereby to produce slack in the chain in order that obstructions falling upon the track may pass around the periphery of said wheels without breaking the chain. Hitherto when attempts have been made to apply a self-laying track attachment to autos, provision for this has not been made. In my invention this is accomplished through the joint 16 between the frame members 5 and 12. Another omission in prior structures of this nature is that the driving force of the tracks is transmitted to the main frame solely through the springs 11. Under heavy loads and in difficult situations this force would break the springs. I provide the thrust bars 7 through which the force is transmitted from the propelling mechanism to the main frame, the spring being relieved of any driving strain.

It is also important to reduce or eliminate noise and forcible striking of the links of the chain against the front guide wheel, more especially since high speeds are attainable with a vehicle of this sort. The rubber tires on the guide wheels in the present instance not only eliminate noise, but form a yielding surface which prevents the usual slapping of the links against the periphery of the wheel.

Having thus described my invention what I claim and desire to secure by Letters Patent is—

1. In an auto tractor the combination of a main frame and the usual axle and spindle thereof, of a supplemental frame supported on the spindle and connected with the main frame to prevent oscillation, a rocking truck pivoted on the supplemental frame, suitably supported front and rear sprockets, and an endless track belt embracing the sprockets and rocking truck, and rollers on the truck engaging the belt and supporting the load.

2. In an auto tractor, the combination of a main frame and the driving axle thereof, a tractor attachment including a supplemental frame supported on the axle against rotation, a roller truck pivoted on the supplemental frame, a front idler mounted on an extension of the roller truck, a driving sprocket in line with the front idler and supported on a rearward extension of the supplemental frame and an endless flexible self-laying track embracing the sprocket, idler and truck rollers.

3. An auto tractor consisting in the combination with a main frame and the ordinary axle thereof of a tractor attachment including a supplemental frame supported on the axle, a radius rod pivotally connected with the main frame to hold the supplemental frame against rotation, a roller truck supporting the supplemental frame, an endless self-laying track on which the roller truck runs, and a rear driving sprocket and a front idler for guiding the track in its orbit.

4. In an auto tractor, a rear driving axle and self-laying track propelling mechanism operatively connected to the axle at each end thereof, said propelling mechanism including a rear driving wheel and a front guide wheel for the track chain, and roller truck mechanism operating upon the ground stretch of the chain and supporting the axle, said sprocket and guide wheels being mounted for swinging movement toward and from each other.

5. In an auto tractor, a rear driving axle and self-laying track propelling mechanism operatively connected to the axle at each end thereof, said propelling mechanism including a rear driving wheel and a front guide wheel for the track chain, roller truck mechanism operating upon the ground stretch of the chain and supporting the axle, and a jointed carrying frame for said sprocket and guide wheels mounted upon the axle permitting movement of said wheels toward and from each other.

6. In an auto tractor, a rear driving axle and self-laying track propelling mechanism operatively connected to the axle at each end thereof, said propelling mechanism including a rear driving wheel and a front guide wheel for the track chain, roller truck mechanism operating upon the ground stretch of the chain and supporting the axle, and a jointed carrying frame for said sprocket and guide wheels mounted upon the axle permitting movement of said wheels toward and from each other, the section of the frame carrying the driving wheel being fixed relatively to the axle and the section carrying the guide wheel being movable with respect thereto.

7. In an auto tractor, a rear driving axle and self-laying track propelling mechanism operatively connected to the axle at each end thereof, said propelling mechanism including a driving sprocket wheel for the track chain, a supporting frame for said sprocket wheel carried upon the axle and extending rearwardly therefrom, a rocking truck frame pivotally connected to the supporting frame for the sprocket wheel, and a front guide wheel for the track chain journaled upon said truck frame, and supporting rollers journaled in the truck frame and operating upon the ground stretch of the track chain.

8. In an auto tractor, a rear driving axle and self-laying track propelling mechanism operatively connected to the axle at each end thereof, said propelling mechanism including a driving sprocket wheel for the track chain, a supporting frame for said sprocket wheel carried upon the axle and extending rearwardly therefrom, a rocking truck frame pivotally connected to the supporting frame for the sprocket wheel, and a front guide wheel for the track chain journaled upon said truck frame, and supporting rollers journaled in the truck frame and operating upon the ground stretch of the track chain, and a thrust bar connected to the supporting frame for the sprocket wheel and extending forwardly and pivoted to the main frame.

9. In an auto tractor, a rear driving axle, a spring mounted upon the axle and supporting the main frame, self-laying track propelling mechanism operatively connected with the axle at each end thereof, and a universally pivoted thrust bar extending forwardly from each propelling mechanism and pivotally connected to the main frame.

10. In an auto tractor, self-laying track propelling means including a driving sprocket, a guide wheel, a track chain passing around both of said wheels, means for permitting bodily movement of the wheels in relation to each other, and a continuous rubber tire upon the guide wheel for providing yieldable supports for the chain.

In testimony whereof I have hereunto set my hand.

PLINY E. HOLT.